S. Withington,
Dovetailing Machine,
N°22,222. Patented Nov. 30, 1858.
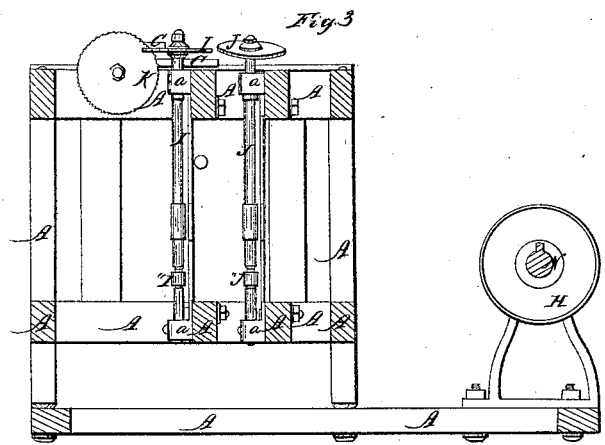
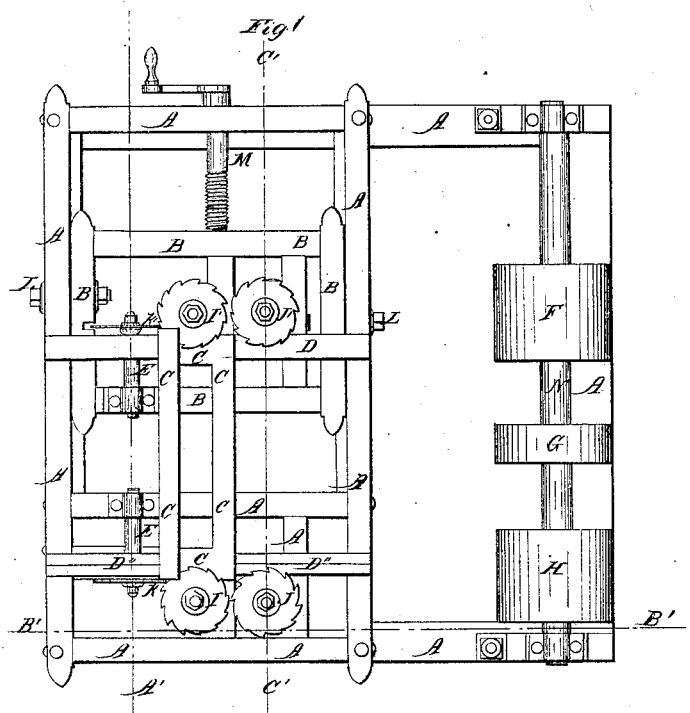
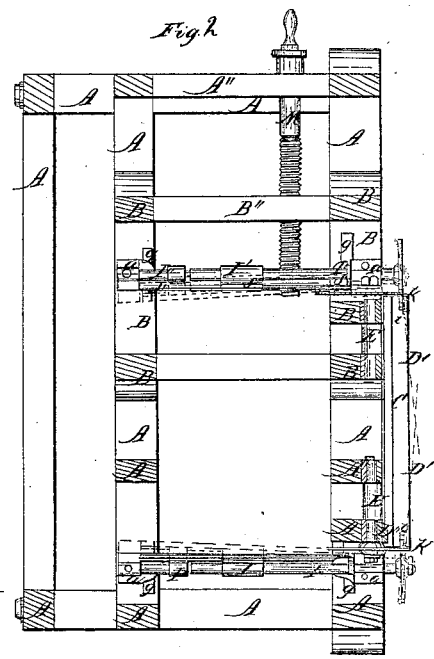

UNITED STATES PATENT OFFICE.

SOLANDER WITHINGTON, OF ST. LOUIS, MISSOURI.

MACHINE FOR CUTTING DOVETAIL MORTISES.

Specification of Letters Patent No. 22,222, dated November 30, 1858.

*To all whom it may concern:*

Be it known that I, SOLANDER WITHINGTON, of the city of St. Louis and State of Missouri, have invented a new and useful Machine for Mortising Window-Stiles; and I do hereby declare that the following is a full, clear, and exact description of the same, reference being had to the annexed drawing, making part of this specification, in which—

Figure 1 is a plan, Fig. 2 a vertical section through A' A', and Fig. 3, a vertical section through B' B'.

Similar letters of reference represent corresponding parts of the different figures.

The object of my invention is to prepare window-stiles; and it consists in a certain combination of saws, and in so arranging and adjusting these saws, into a machine, as to cause them to cut off the stile, the proper length, and cut a dovetail, mortise, in both ends at one and the same time, and in one operation; that is to say, without changing the "stuff" after it has been once placed upon the machine.

To enable others skilled in the arts to make and use my invention, I will proceed to describe its construction and operation.

A is the main frame upon which, the different parts, of the machine are mounted.

B is a carriage, fixed in the main frame, to which it is secured, in any given position, by means of the screw bolts L L.

M is a screw which is secured in the frame at A'' Fig. 2, and which, passes through a nut, fixed in the carriage B at B,'' by which the said carriage is moved to and fro, and by which its position is regulated.

I' I and J' J, are saw mandrels, upon which the saws I' I and J' J are fixed. The mandrels I' and J', are fixed in the carriage, B, and the mandrels I and J are fixed on the main frame. These mandrels are secured to the frame of the machine by means of plumber blocks, shown at a, a. The lower end of these mandrels, terminate in a pivot journal, which has its bearing in a corresponding socket, at I'', the said socket being secured in the lower plumber block a; the upper plumber block a, constitutes the upper journal box for the mandrel. The two saw mandrels I' I stand on a vertical plane, both ways, and the two saws fixed upon these two mandrels, both operate upon the same horizontal plane, or line. The two mandrels J' J, both set in the same vertical plane in the direction of the line c' c', but in the opposite direction. They set in opposite diagonal planes as shown in red, Fig. 2, and by consequence, the saws fixed upon the last named mandrels will also operate upon diagonal planes, as shown by the red lines D' D', Fig. 2.

E, E, are saw mandrels, both of which are fixed in the same horizontal, as well as the same vertical plane, as shown in Figs. 1 and 2. One of these mandrels is fixed in the carriage B and the other is fixed in the main frame; and upon them the saws K' K, are secured.

C is a carriage, which is made to work to and fro across the frame of the machine, upon the rails of tracks D'' D. The track D'' has a dove-tail groove raised, on its face, and the carriage has a dove tail mortise, cut in its under side, to correspond with the groove, into which its works.

N is the driving shaft, and G is the driving pulley, fixed upon the said shaft.

H and F are drum pulleys from which belts are led to the different saw mandrels, by which the saws are driven.

Now suppose the machine into operation. Let the carriage, c be drawn back to the left of the saws K' K, and let the "stuff" out of which the stiles are to be made, be laid upon the said carriage. Now let the carriage be advanced. The saws K' K will cut off the stile to the proper length and the saws I' I, will cut a horizontal groove, or mortise. into the end of it, that is in both ends of it at the same time. The carriage being still further advanced the saws J' J, enter the horizontal mortise already cut in the end of the stile, but these last named saws, being set in diagonal planes, will, as they advance into the stile, convert, the parallel, mortise, in the end of the stile, into a dove tail mortise by reason of their angular position, as shown at i i in Fig. 2. These saws are all made of the same thickness, and of such a thickness as it is required to make the narrowest part of the mortise, by which the bottom of the mortise is cleaned out as soon as cut. In short, the mortising of the stile is complete, as soon as the saws J J have passed through it.

When it is desired to make a double mortise in the end of the stiles, it is only necessary to slip a collar on the upper end of the saw mandrels, above the saws and then place another saw above those already there;

the distance between the two mortises will thus be regulated, by the thickness of the collar which separates the saws.

Having thus described the construction and operation of my machine, what I claim as new, therein and as my invention, is—

1. The combination, of the saws I′ I and J′ J, with each other and with the two saws K′ K in the manner described, the two saws J′ J being set in a diagonal plane in the manner set forth, for the purpose set forth.

2. And I also claim adapting and arranging the carriage C with the described combination of saws, for the purpose specified.

3. And I further claim, the arranging of the three saws K′ I′ and J′ in the carriage B, by which the machine is adapted to cut the different lengths of stile, all of which is respectfully submitted.

SOLANDER WITHINGTON.

Witnesses:
JOSEPH W. GEARY,
AMOS BROADNAX.